(12) United States Patent
Green

(10) Patent No.: US 9,158,504 B2
(45) Date of Patent: Oct. 13, 2015

(54) METHOD AND SYSTEM TO AUTOMATICALLY GENERATE USE CASE SEQUENCE DIAGRAMS AND CLASS DIAGRAMS

(71) Applicant: David W. Green, Richmond, TX (US)

(72) Inventor: David W. Green, Richmond, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/044,161

(22) Filed: Oct. 2, 2013

(65) Prior Publication Data

US 2014/0109048 A1 Apr. 17, 2014

Related U.S. Application Data

(60) Provisional application No. 61/713,144, filed on Oct. 12, 2012.

(51) Int. Cl.
G06F 9/44 (2006.01)

(52) U.S. Cl.
CPC ... G06F 8/24 (2013.01); G06F 8/71 (2013.01); G06F 8/73 (2013.01); G06F 8/75 (2013.01)

(58) Field of Classification Search
None
See application file for complete search history.

(56) References Cited

U.S. PATENT DOCUMENTS

| 2006/0053414 | A1* | 3/2006 | Bhandari et al. | 717/133 |
|---|---|---|---|---|
| 2007/0129931 | A1 | 6/2007 | Lee et al. | |
| 2009/0204939 | A1 | 8/2009 | Lavrova et al. | |
| 2011/0110590 | A1* | 5/2011 | Suzuki | 382/173 |

FOREIGN PATENT DOCUMENTS

| KR | 1020010056462 A | 7/2001 |
|---|---|---|
| KR | 1020040097941 A | 11/2004 |
| KR | 1020110088846 A | 8/2011 |

OTHER PUBLICATIONS

Martin Fowler, UML Distilled Third Eddition, A Brief Guide to the Standard Object Modeling Language, 2003.*
Non-Patent website, Yanic Inghelbrecht, A Quick Introduction to UML Sequence Diagrams [online] 2006-2013 [retrieved on Oct. 15, 2014], retrieved from internet <www.tracemodeler.com/articles/a_quick_introduction_to_uml_sequence_diagrams/>.*

(Continued)

*Primary Examiner* — Isaac T Tecklu
*Assistant Examiner* — Shirin Alizadeh
(74) *Attorney, Agent, or Firm* — Cantor Colburn LLP

(57) ABSTRACT

A system and computer-executed method automatically generate a sequence diagram from Class-Responsibility-Collaborator (CRC) information. The CRC information identifies objects, responsibility information for each object, and collaborator information for each object, and the CRC information corresponds with each activity in an activity diagram. The method includes storing, in a storage device, the objects and corresponding class types of the objects according to the CRC information and associating, by a processor, each of the objects with one or more other objects according to the collaborator information of the CRC information. The method also includes determining, by the processor, messages from each of the objects to associated objects according to the responsibility information, and the processor automatically generating the sequence diagram including the objects and the messages among the objects.

16 Claims, 8 Drawing Sheets

(56) References Cited

OTHER PUBLICATIONS

Non-Patent website 8 UML Class Diagrams, [online], Feb. 2009, [retrieved on Oct. 16, 2014], retrieved from internet <http://jgrasp.org/tutorials187/08_UML.pdf>.*

"Developing Internet Hypermedia System by Using Scenario-Based Object-Oriented Methodology", [online], [retrieved on Apr. 15, 2015].*

N.A., "Lesson 2.1: Create sequence diagrams", pp. 1-9, retrieved Sep. 24, 2013, retrieved from http://pic.dhe.ibm.com/infocenter/rsysarch/v11/index.jsp?topic=%2Fcom.ibm.sa.tutorial.doc%2Ftopics%2FLess2.1_BuildASequenceDiagram.html.

International Search Report and Written Opinoin for PCT Application No. PCT/US2013/064429, Jan. 1, 2008, pp. 1-9.

* cited by examiner

METHOD AND SYSTEM TO AUTOMATICALLY GENERATE USE CASE SEQUENCE DIAGRAMS AND CLASS DIAGRAMS

CROSS-REFERENCE TO RELATED APPLICATION

This application is a Non-Provisional of U.S. Provisional Patent Application No. 61/713,144 filed Oct. 12, 2012, the disclosure of which is incorporated by reference herein in its entirety.

BACKGROUND

The development of a software system, to process well log data obtained in a downhole environment, for example, typically entails multiple software programmers developing multiple elements that must eventually be integrated together. Thus, tools that allow modeling and top-level visualization of systems are employed in software design. For example, Unified Modeling Language (UML) provides a common design language to model computer applications. UML provides several types of diagrams that facilitate ease of understanding of an application under development. System requirements can be decomposed into a model that includes diagrams depicting system behavior. Major behavioral aspects are decomposed into "Use Cases" to help analyze system functionality. Sequence diagrams are a UML notation and one way in which to capture behavior within each Use Case. However, because sequence diagrams are cumbersome to generate and maintain, they tend to become out-of-date as a software development project progresses and, therefore, less useful in validating a design. Accordingly, a system and method to efficiently construct and maintain sequence diagrams and class diagrams would be appreciated in the software development industry.

SUMMARY

According to one aspect of the invention, a computer-executed method of automatically generating a sequence diagram from Class-Responsibility-Collaborator (CRC) information, the CRC information identifying objects, responsibility information for each object, and collaborator information for each object, and the CRC information corresponding with each activity in an activity diagram, includes storing, in a storage device, the objects and corresponding class types of the objects according to the CRC information; associating, by a processor, each of the objects with one or more other objects according to the collaborator information of the CRC information; determining, by the processor, messages from each of the objects to associated objects according to the responsibility information; and the processor automatically generating the sequence diagram including the objects and the messages among the objects.

According to another aspect of the invention, a computer-executed method of automatically generating a class diagram from Class-Responsibility-Collaborator (CRC) information, the CRC information identifying an object, responsibility information for the object, and collaborator information for the object, and the CRC information corresponding with each activity in an activity diagram, includes storing, in a storage device, the objects and corresponding class types of the objects according to the CRC information; associating, by a processor, each of the objects with one or more other objects according to the collaborator information of the CRC information; determining, by the processor, dependencies among the objects according to the responsibility information associated with each object; and the processor automatically generating the class diagram including the objects and the dependencies among the objects.

According to yet another aspect, a system to automatically generate a sequence diagram and a class diagram from Class-Responsibility-Collaborator (CRC) information, the CRC information identifying an object, responsibility information for the object, and collaborator information for the object, and the CRC information corresponding with each activity in an activity diagram, includes a storage device to store the CRC information and instructions for deriving information from the CRC information; a processor to execute the instructions to generate the sequence diagram and the class diagram based on the information derived from the CRC information; and an output device configured to output the sequence diagram or the class diagram.

BRIEF DESCRIPTION OF THE DRAWINGS

Referring now to the drawings wherein like elements are numbered alike in the several Figures.

DETAILED DESCRIPTION

While one or more embodiments have been shown and described, modifications and substitutions may be made thereto without departing from the spirit and scope of the invention. Accordingly, it is to be understood that the present invention has been described by way of illustrations and not limitation.

Figure 1:
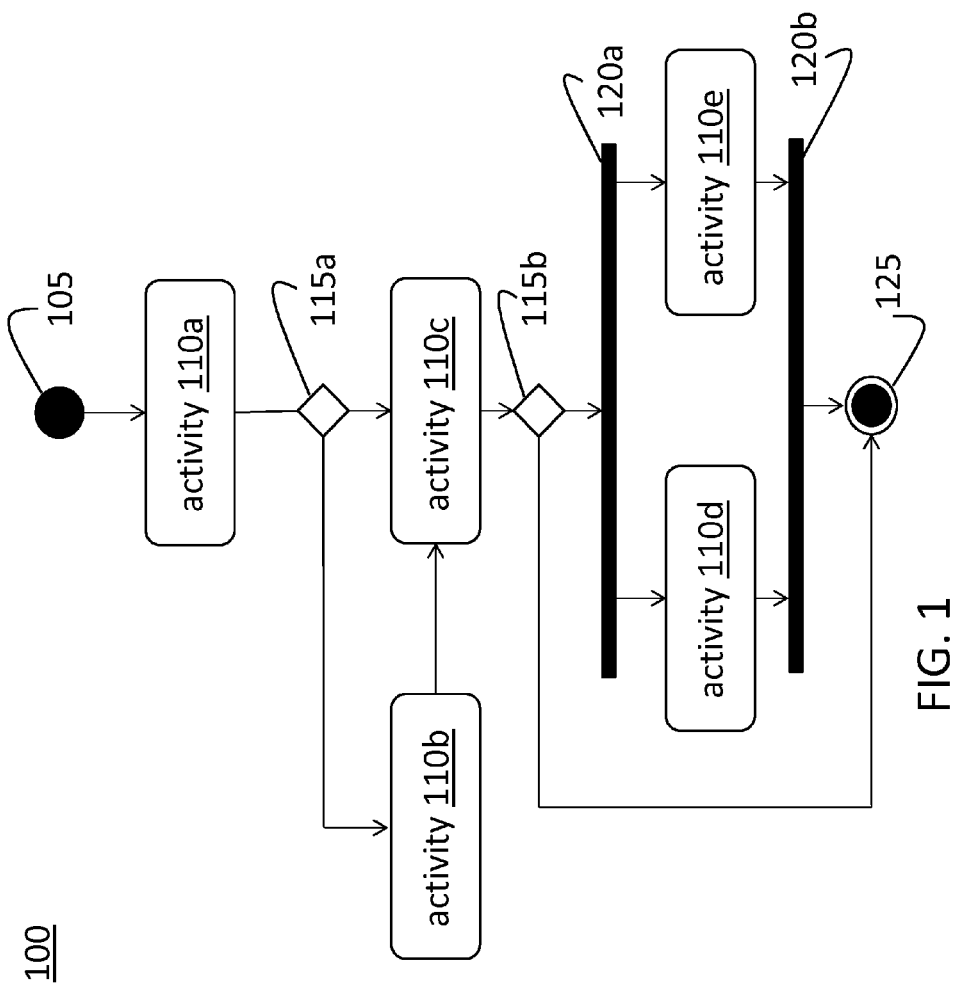
FIG. 1 is an exemplary activity diagram.
Figure 2:
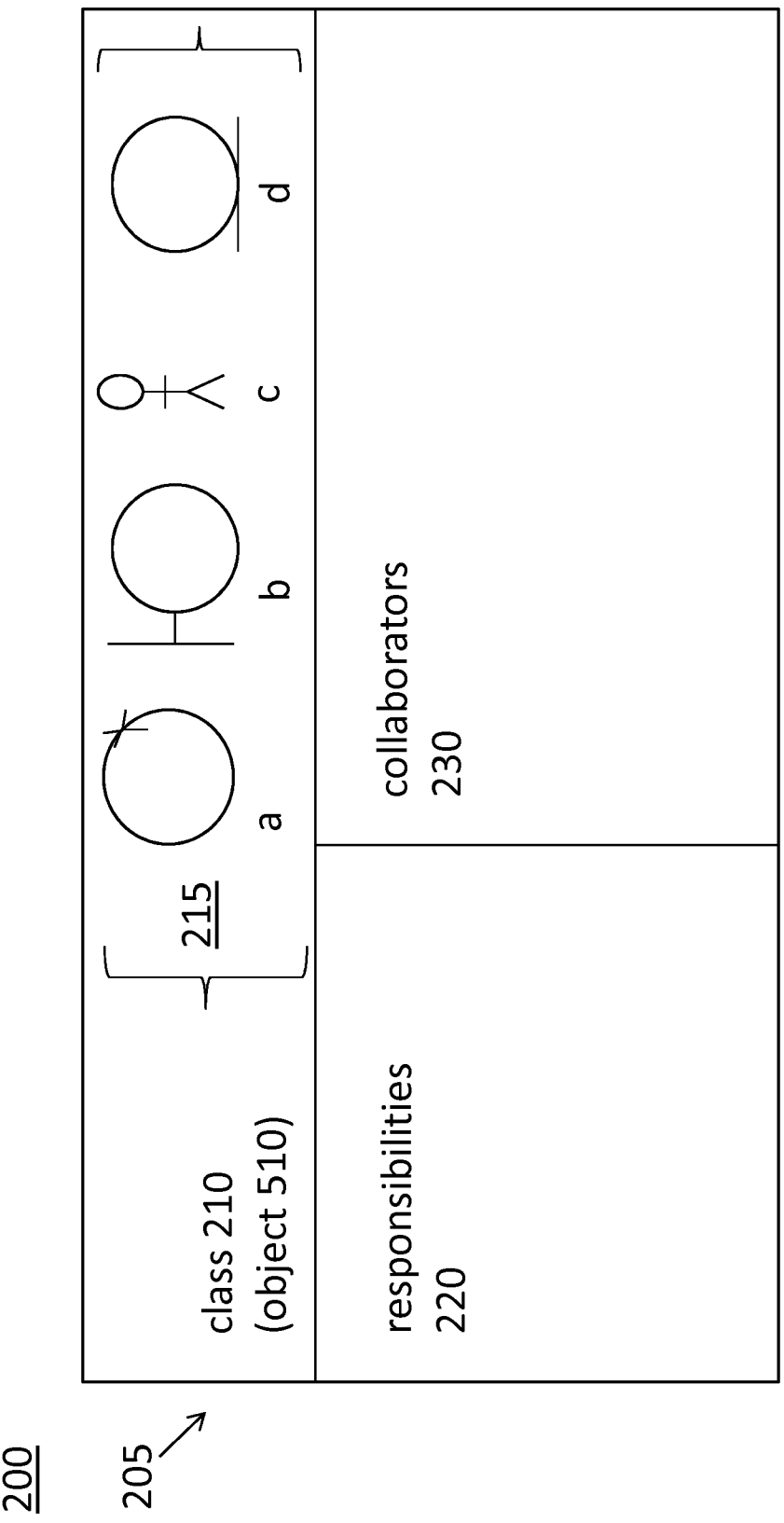
FIG. 2 depicts an exemplary Class-Responsibility-Collaboration (CRC) card representing CRC information according to an embodiment.
Figure 3:
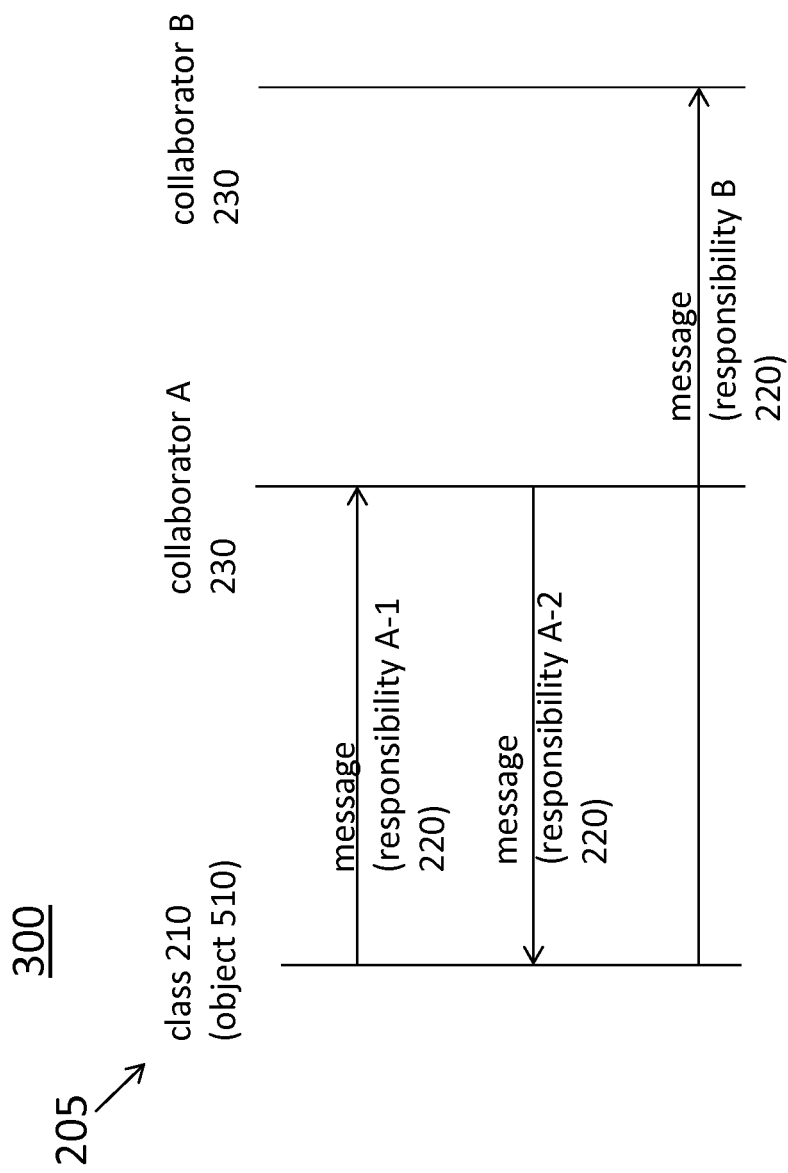
FIG. 3 depicts an exemplary activity-level sequence diagram representing CRC information according to an embodiment.

As noted above, maintaining up-to-date sequence diagrams throughout a software development process becomes a cumbersome and often-neglected task. Embodiments detailed below include a system and method to automatically generate and update a sequence diagram and a class diagram. One or more Class-Responsibility-Collaboration (CRC) cards, detailed below with reference to FIG. 2, are associated with each activity in an activity diagram, detailed with reference to FIG. 1. In alternate embodiments, activity-level sequence diagrams, as shown in FIG. 3, are manually built to represent the CRC information additionally or instead. Based on the CRC information, a sequence diagram and a class diagram are automatically generated. The software development process and many of the aspects of the embodiments described herein involve one or more processors working in conjunction with one or more memory devices that store operation commands and data.

FIG. 1 depicts an exemplary activity diagram 100. In UML, an activity diagram describes step-by-step workflows of components in a system. An activity diagram shows the overall flow of control. The symbols used in a UML activity diagram are discussed with reference to FIG. 1. The black circle 105 represents the start of the workflow or its initial state. Each activity 110 is shown represented by a rounded rectangle. The triangles 115a and 115b represent decision points. The bars 120a and 120b represent a start (split) or end (join) of concurrent activities (110d and 110e), and the encircled black circle 125 represents the end or final state of the activity diagram 100. The activity diagram 100 essentially shows what a system is intended to do. The activity diagram 100 is generated by one or more software programmers in planning and executing the software development.

In the wellbore data processing example, the exemplary activity diagram 100 may include an activity 110a of receiving data collected by one or more sensors downhole. At 115a, a decision may be made whether all the expected data was telemetered from sensors in the borehole to a processing system on the surface. The processing system, a computer, for example, may include one or more processors and one or more memory devices and the processing system, alone or in combination with other processing systems in a network would be implementing the software system described by the activity diagram 100. If the decision at 115a were that all the data is not received, activity 110b may include collecting the remaining data. Upon completion of activity 110b or if the decision at 115a were that all the data was available, activity 110c may include pre-processing the collected data. Based on a decision regarding the pre-processing at 115b, the activities may end in this Use Case (125) or a split 120a may lead to parallel processing of activities 110d and 110e to separately process and display results of sensor data processing. The end of the parallel processing (120b) also leads to the end (125) of the activities in the exemplary Use Case.

FIG. 2 depicts an exemplary Class-Responsibility-Collaboration (CRC) card 200 representing CRC information 205 according to an embodiment. CRCs were traditionally used in brainstorming and high-level system planning. In embodiments described herein, CRC information 205 is instead used to facilitate automatic generation of sequence diagrams and class diagrams (FIG. 3). One or more software programmers generate one or more CRC cards 200 or, alternatively, activity-level sequence diagrams 300 (FIG. 3) associated with each activity 110 in the activity diagram 100. One activity 110 may involve more than one object 510 belonging to one or more classes 210 and, therefore, may give rise to more than one CRC card 200. The CRC information 205 captures the essential elements of an object 510 of a class 210. A class 210 represents a collection of similar objects 510. Four UML class types 215, illustrated in FIG. 2 by their commonly used symbols, are: Actor (a), Boundary (b), Control (c), and Entity (d). The Actor class type 215 specifies a role played by a user or another system that interacts with the subject software system. The Boundary class type 215 handles communication between actors and the subject system's internal components. The Control class type 215 handles the flow of control for a use case and can, therefore, be seen as coordinating representation classes 210. The Entity class type 215 models the information handled by the subject system and sometimes the behavior associated with the information. Each class 210 has one or more responsibilities 220 and one or more collaborators 230 which are other objects 510 of the same or other classes 210 with which the subject class 210 must interact in order to fulfill its responsibilities 220.

In the exemplary wellbore data processing system discussed with reference to FIG. 1, activity 110a (receiving data collected by one or more processors downhole) would be associated with CRC information 205 for an object 510 in a class 210 of Entity type, for example. The responsibilities 220 of the receiver class include collecting and buffering data telemetered or otherwise provided by downhole sensors. The collaborators 230 of the receiver class would be each of the sensors and any additional system involved in providing the sensor data. As a software design team adds to and modifies the activity diagram 100 during development of the software system, the CRC information 205 associated with each new or modified activity 110 is also added to or modified to maintain an accurate association between the CRC information 205 and each activity 110. As discussed below, the CRC information 205 is used to create and update the sequence diagram and class diagram associated with the software system.

FIG. 3 depicts an exemplary activity-level sequence diagram 300 representing CRC information 205 according to an embodiment. As discussed above with reference to FIG. 2, the CRC information 205 may be represented in a CRC card 200, as depicted at FIG. 2, or may instead be represented by an activity-level sequence diagram 300. Messages representing responsibilities 220 of the object 410 of the class 210 are shown being sent to and received from collaborators 230 (other objects 510 of the same or another class 210). Sequence diagrams are further detailed below with reference to FIG. 6.

Figure 4:
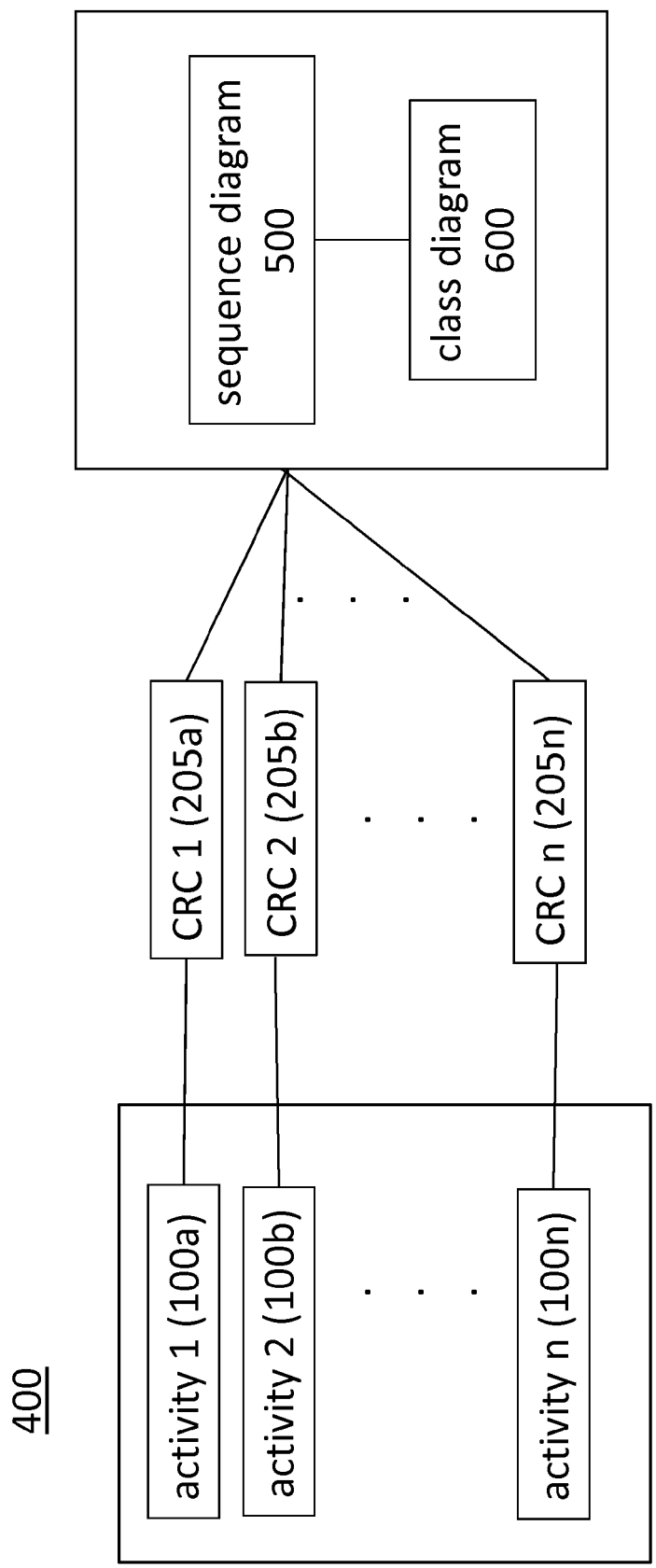
FIG. 4 is a block diagram of an aspect of a software development system according to an embodiment.

FIG. 4 is a block diagram of an aspect of a software development system 400 according to an embodiment. As discussed above, the step-by-step workflow of components in the software system is captured in an activity diagram 100 that shows the sequence of activities 110. Each activity 110 is then associated with CRC information 205, which may be represented by a CRC card 200 (FIG. 2) or by an activity-level sequence diagram 300 (FIG. 3). This association allows the automatic generation of a sequence diagram 500 and a class diagram 600 (FIGS. 5 and 6, respectively) for the use case represented by the activity diagram 100. The detailed descriptions of the sequence diagram 500, with reference to FIG. 5 below, and the class diagram 600, with reference to FIG. 6 below, illustrate that, when a programmer generates or updates corresponding CRC information 205 each time he or she adds or modifies an activity 110 in the activity diagram 100, all the information needed to automatically create and update the sequence diagram 500 (FIG. 5) and class diagram 600 (FIG. 6) becomes available and, thereby, eliminates the cumbersome task of manually keeping these diagrams up-to-date.

Figure 5:
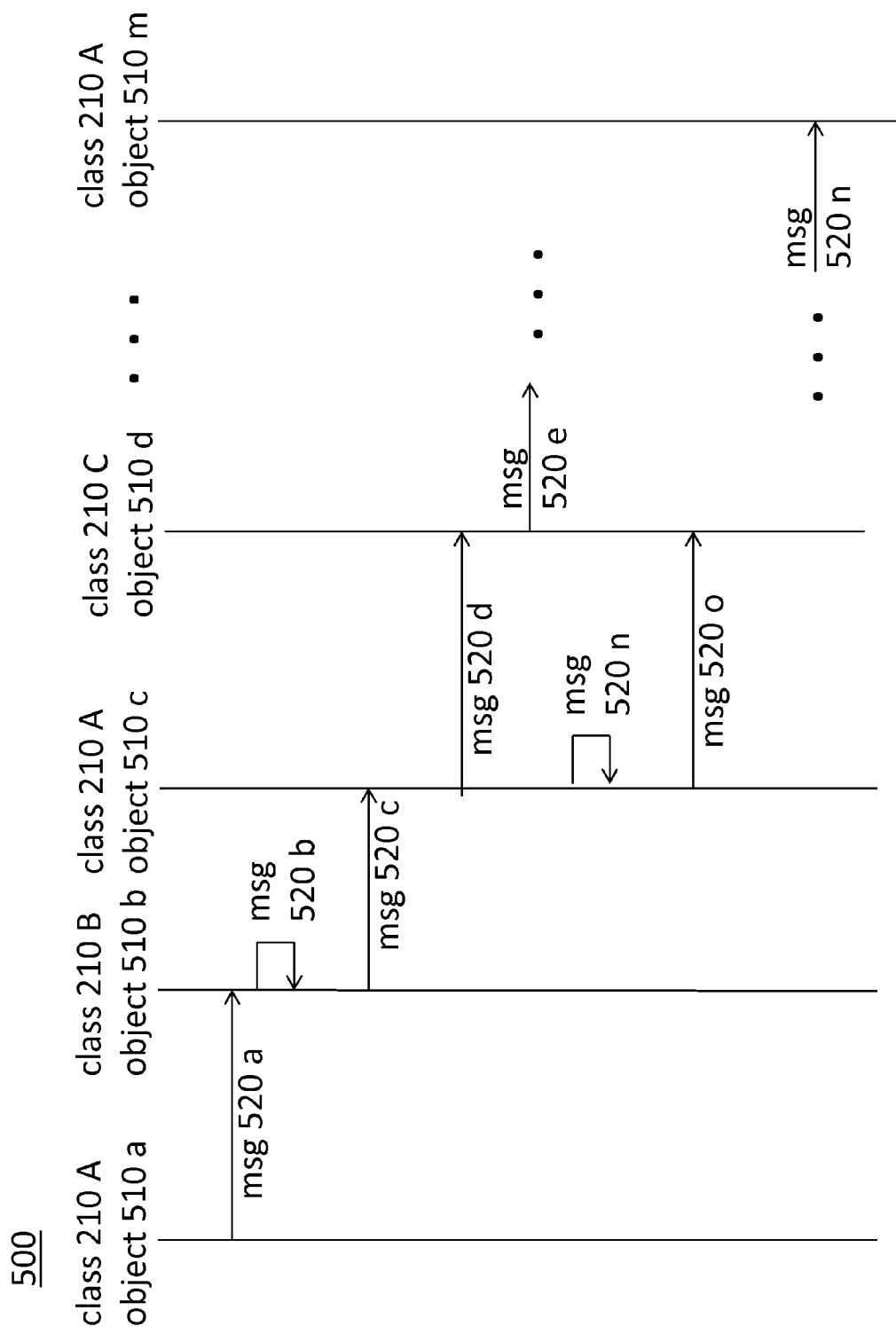
FIG. 5 depicts an exemplary sequence diagram according to an embodiment.

FIG. 5 is an exemplary sequence diagram 500 according to an embodiment. The sequence diagram 500 is automatically generated from CRC information 205 produced, by a programmer, for each of the activities 110 in the activity diagram 100. From the CRC information 205, not only is each class 210 available but also, every object 510 (instance of a class 210) and every message 520 exchanged between objects 510 are available based on the stated responsibilities 220 and collaborators 230. The exemplary sequence diagram 500 of FIG. 5 shows the sequence of messages 520 exchanged by objects 510 of different classes 210 (of the four types discussed above). The notation in the sequence diagram 500 may include the symbol associated with the class type 215 (shown in FIG. 2). A message 520 sent from an object 510 to itself (e.g., msg 520*b* at object 510*b*) represents processing within the object 510 (a method called by the object 510.

Figure 6:
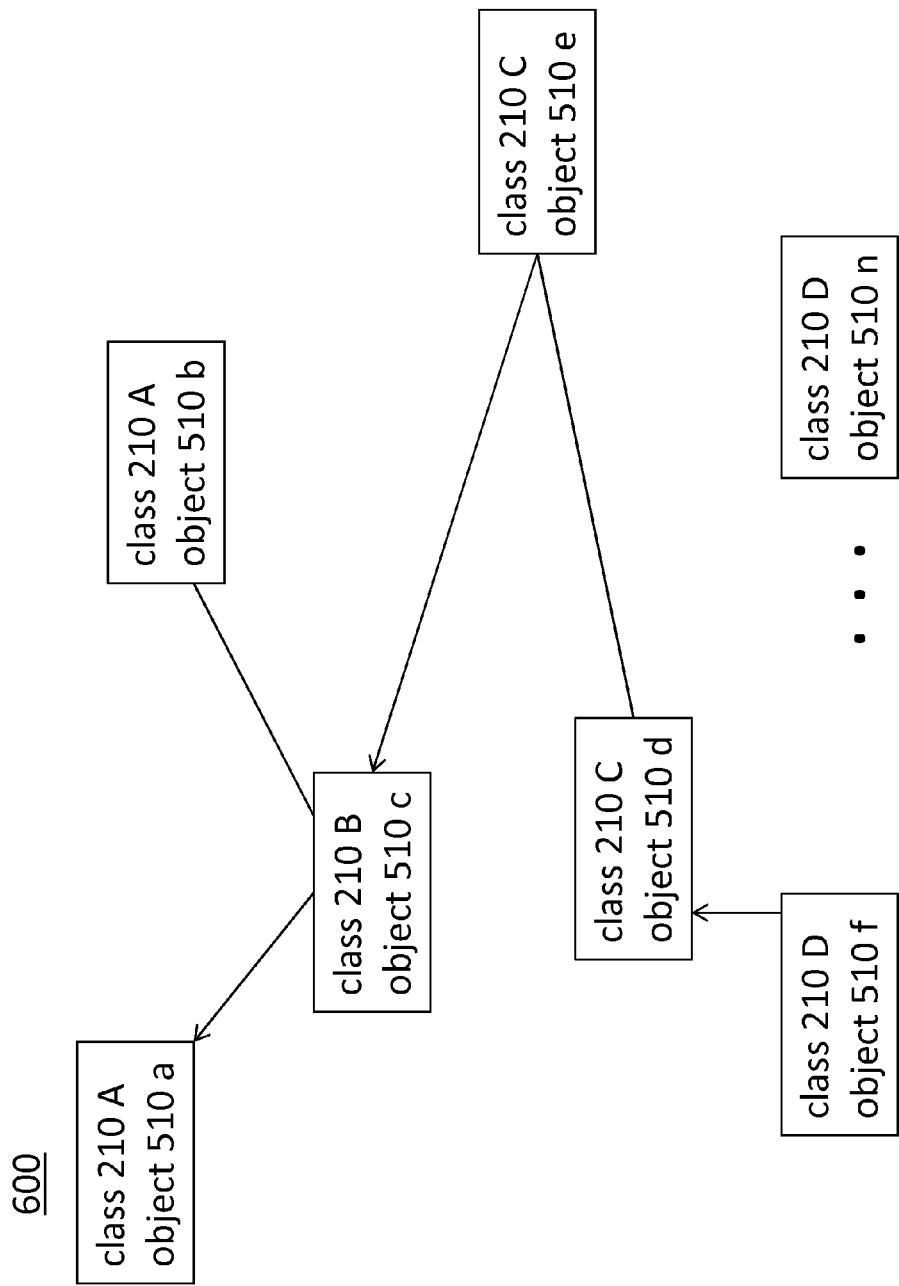
FIG. 6 depicts an exemplary class diagram according to an embodiment.

FIG. 6 is an exemplary class diagram 600 according to an embodiment. The class diagram 600 is automatically generated from the CRC information 205 produced, by one or more of the system programmers, in association with each activity 110 in the activity diagram 100. By accessing the collaborators 230 on the CRC card 200 of each object 510, the associations among the objects 510 can be determined by a processor. In alternate embodiments, the association information is even more readily available from an activity-level sequence diagram 300 representing the CRC information 205. Based on the class type 215 of each object 510 and its responsibilities 220 as indicated by the CRC information 205 for the object 510, dependencies among the objects 510 may also be automatically determined by a processor. The class diagram 600 illustrates the dependencies among the objects 510 of each class 210. A hierarchical interrelationship among the objects 510 may be determined based on the responsibilities 220. The class type 215 of each object 510 may be represented by the symbol associated with each class type 215 (shown in FIG. 2) in the class diagram 600.

Figure 7:
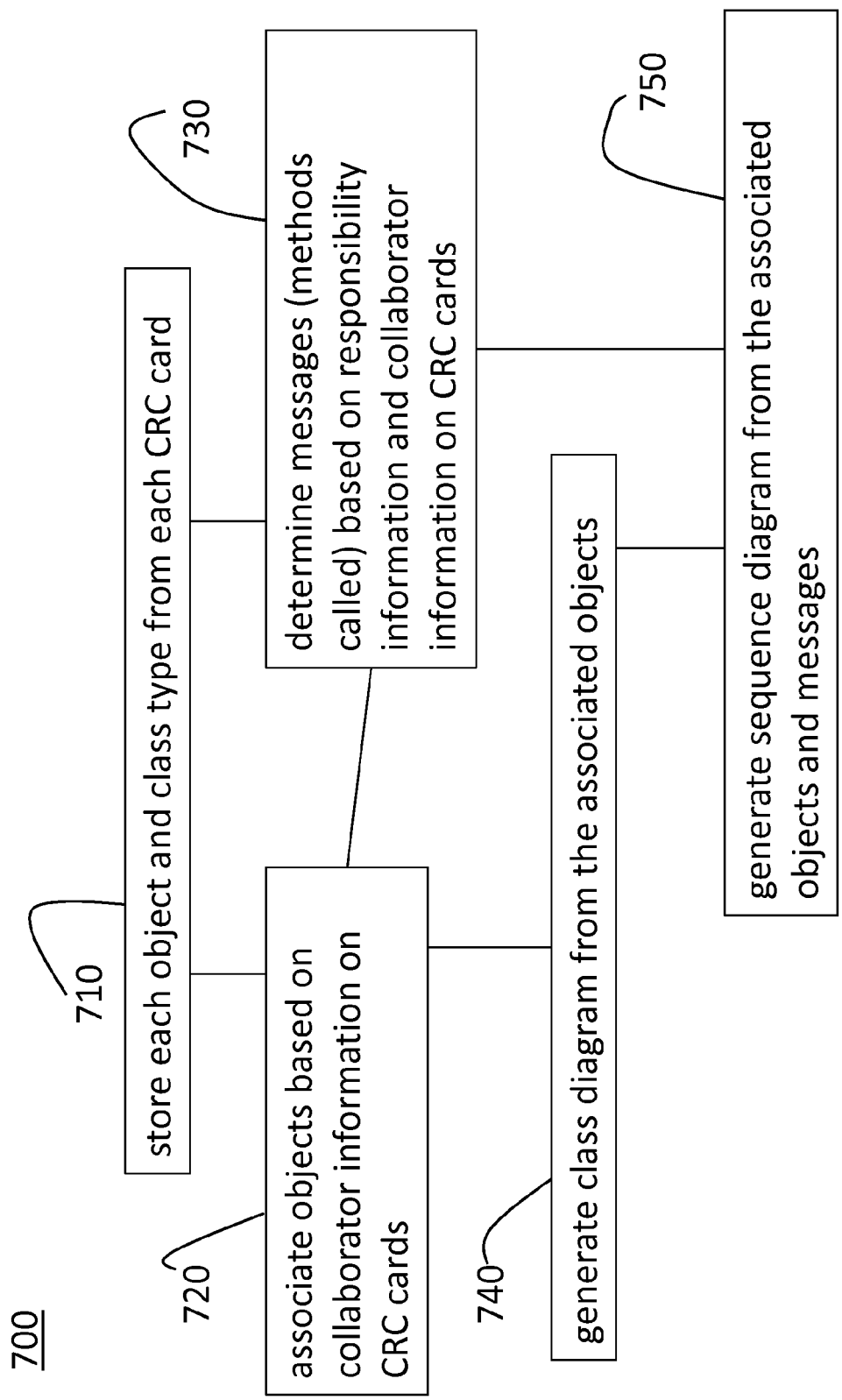
FIG. 7 depicts the processes involved in automatically generating a sequence diagram and a class diagram according to an embodiment.

FIG. 7 depicts the processes 700 involved in automatically generating a sequence diagram 500 and a class diagram 600 according to an embodiment. The processes 700 include storing each object 510 and class type 215 from CRC information 205 created by one or more system programmers (in the form of CRC cards 200 or activity-level sequence diagrams 300) corresponding to each activity 115 listed in the activity diagram 100 at block 710. At block 720, associating objects 510 based on the collaborator 230 information of the CRC information 205 includes determining dependencies among the objects 510 (when the CRC information 205 is represented as a CRC card 200) or using the indicated dependencies (when the CRC information 205 is represented as an activity-level sequence diagram 300). At block 630, determining messages 520 (methods called) based on responsibility 220 information and collaborator 230 information on the CRC cards 200 may include accessing a look-up table or other form of stored information. When the CRC information 205 is represented as an activity-level sequence diagram 300, the messages 520 may be used as indicated. The processes 700 include automatically generating a class diagram 600 based on the object 510 associations at block 740. The processes 700 also include automatically generating a sequence diagram 500 based on the object 510 associations and messages 520. The processes 700 are executed by one or more processors in conjunction with one or more memory devices, such as in a computer.

Figure 8:
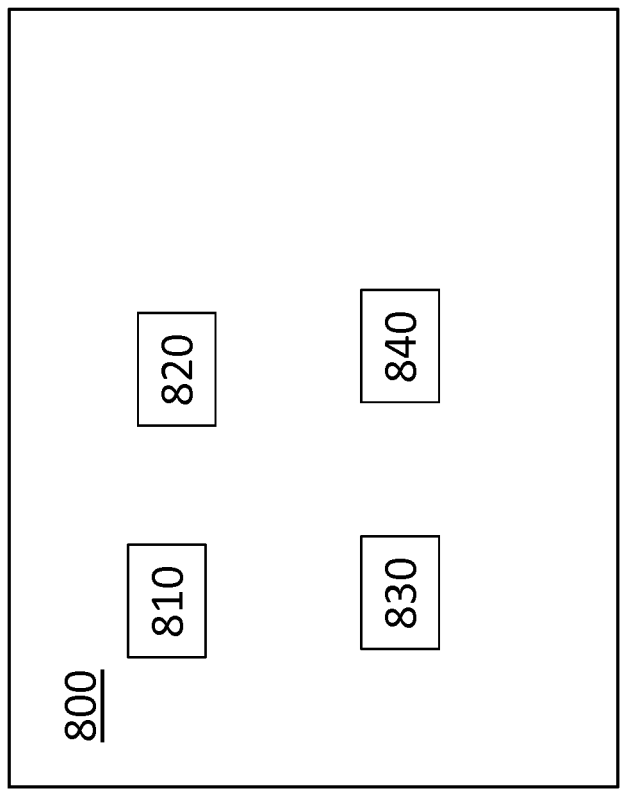
FIG. 8 is a block diagram of a system to automatically generate a sequence diagram and a class diagram according to an embodiment.

FIG. 8 is a block diagram of a system 800 to automatically generate a sequence diagram 500 and a class diagram 600 according to an embodiment. The system 800 includes one or more processors 810 to execute processes such as those discussed with reference to FIG. 7. The system 800 also includes one or more memory devices 820 to store a look-up table associating responsibilities 220 with message 520, for example. A user interface 830 allows a user to interact with the system 800. The user may be, for example, a software developer who creates one or more CRC cards 200 or activity-level sequence diagram 300 for an activity 115 in an activity diagram 100. The user interface 830 may include, for example, a keyboard or other input device. An output 840 provides the user with the automatically generated sequence diagram 500 and class diagram 600. The output 840 may include a display device to display the sequence diagram 500 and the class diagram 600. The output 840 may also include a printer port or other interface to provide a copy of the sequence diagram 500 and the class diagram 600.

It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A computer-executed method of automatically generating a sequence diagram from Class-Responsibility-Collaborator (CRC) information, the CRC information identifying objects, responsibility information for each object, and collaborator information for each object, and the CRC information for each object being stored in a form of a CRC card corresponding to the object, the method comprising:
storing, in a storage device, the objects and corresponding class types of the objects according to the CRC information indicated on the CRC card corresponding to each of the objects;
associating, by a processor, each of the objects with one or more other objects according to the collaborator information of the CRC information indicated on the CRC card corresponding to each of the objects;
determining, by the processor, messages from each of the objects to associated objects according to the responsibility information and the collaborator information indicated on the CRC card corresponding to each of the objects;
and the processor automatically generating the sequence diagram including the objects and the messages among the objects based on the objects and the messages.

2. The method according to claim 1, further comprising representing the CRC information as an activity-level sequence diagram.

3. The method according to claim 1, further comprising displaying the sequence diagram.

4. The method according to claim 3, further comprising associating a symbol with each class type, wherein the displaying the sequence diagram includes displaying the symbol of each class type with each object associated with the class type.

5. The method according to claim 1, wherein the determining the messages includes using a look-up table to associate each responsibility included in the responsibility information with each message.

6. A computer-executed method of automatically generating a class diagram from Class-Responsibility-Collaborator (CRC) information, the CRC information identifying an object, responsibility information for the object, and collaborator information for the object, and the CRC information corresponding with each activity in an activity diagram, the method comprising:
   storing, in a storage device, the objects and corresponding class types of the objects according to the CRC information;
   associating, by a processor, each of the objects with one or more other objects according to the collaborator information of the CRC information;
   determining one or more messages sent by each of the objects according to the responsibility information and the collaborator information of the CRC information;
   determining, by the processor, dependencies among the objects according to indicated dependencies in an activity-level sequence diagram specific to each activity;
   and the processor automatically generating the class diagram including the objects and the dependencies among the objects based on the objects and the messages.

7. The method according to claim 6, further comprising representing the CRC information as an activity-level sequence diagram.

8. The method according to claim 6, wherein the determining the dependencies includes determining hierarchical information among the objects.

9. The method according to claim 6, further comprising displaying the class diagram.

10. The method according to claim 9, further comprising associating a symbol with each class type, wherein the displaying the class diagram includes displaying the symbol of each class type with each object associated with the class type.

11. A system to automatically generate a sequence diagram and a class diagram from Class-Responsibility-Collaborator (CRC) information, the CRC information identifying an object, responsibility information for the object, and collaborator information for the object, and the CRC information corresponding with each activity in an activity diagram, the system comprising:
   a storage device to store the CRC information and instructions for deriving information from the CRC information indicated by the activity diagram corresponding to each object;
   a processor to execute the instructions to generate the sequence diagram and the class diagram based on the information derived from the CRC information;
   and an output device configured to output the sequence diagram or the class diagram, wherein the instructions define a process to store the object and corresponding class type and associate the object with one or more other objects according to the collaboration information of the CRC information and the instructions further define a process to determine one or more messages sent by each object according to the responsibility information and the collaborator information of the CRC information and to automatically generate the sequence diagram based on the objects and the messages.

12. The system according to claim 11, further comprising a user interface to facilitate creation and storage of the CRC information associated with the activity diagram.

13. The system according to claim 12, wherein the user interface facilitates a representation of the CRC information as an activity-level sequence diagram.

14. The system according to claim 11, further comprising an output device to output the sequence diagram or the class diagram.

15. The system according to claim 11, wherein the instructions further define a process to determine dependencies among the objects according to the responsibility information of the CRC information for each object and to automatically generate the class diagram based on the objects and the dependencies.

16. The system according to claim 11, wherein the storage device stores the instructions associating a symbol with each class type and displays the symbol of each class type with each object associated with the class type.

* * * * *